United States Patent
Boilevin et al.

(10) Patent No.: US 10,974,642 B2
(45) Date of Patent: Apr. 13, 2021

(54) DEVICE FOR LUMINOUSLY SIGNALLING A CHANGE OF LANE FOR A MOTOR VEHICLE

(71) Applicant: VALEO VISION, Bobigny (FR)

(72) Inventors: Antoine Boilevin, Bobigny (FR); Olivier-Sebastien Lesaffre, Bobigny (FR); Samia Ahiad, Bobigny (FR); Patrice Voirin, Bobigny (FR); Benjamin Adam, Bobigny (FR); Gauthier Lagaisse, Bobigny (FR); Sebastien Cavalli, Bobigny (FR); Julien Martiniak, Bobigny (FR); Denis Garnier, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/604,736

(22) PCT Filed: Apr. 11, 2018

(86) PCT No.: PCT/EP2018/059272
§ 371 (c)(1),
(2) Date: Oct. 11, 2019

(87) PCT Pub. No.: WO2018/189232
PCT Pub. Date: Oct. 18, 2018

(65) Prior Publication Data
US 2020/0189454 A1 Jun. 18, 2020

(30) Foreign Application Priority Data
Apr. 13, 2017 (FR) ...................................... 17 53240

(51) Int. Cl.
*B60Q 1/50* (2006.01)
*G06K 9/00* (2006.01)

(52) U.S. Cl.
CPC ........... *B60Q 1/50* (2013.01); *G06K 9/00791* (2013.01); *B60K 2370/178* (2019.05); *B60K 2370/193* (2019.05)

(58) Field of Classification Search
CPC .. B60Q 1/50; B60Q 2400/50; G06K 9/00791; B60K 2370/178; B60K 2370/193; B60K 2370/334; B60K 35/00
See application file for complete search history.

(56) References Cited

U.S. PATENT DOCUMENTS 8,733,939 B2 * 5/2014 Othmer ................ G01C 21/365
353/13
9,481,287 B2 * 11/2016 Marti ....................... B60Q 1/00
(Continued)

FOREIGN PATENT DOCUMENTS

DE 10 2012 219 572 A1 4/2014
DE 10 2015 201 766 A1 8/2016
(Continued)

OTHER PUBLICATIONS

Mugge, WO 2016184721, germany, machine translation (Year: 2016).*
International Search Report dated Jul. 27, 2018 in PCT/EP2018/059272 filed on Apr. 11, 2018.

*Primary Examiner* — Tracie Y Green
(74) *Attorney, Agent, or Firm* — Oblon, McClelland, Maier & Neustadt, L.L.P.

(57) ABSTRACT

A device for luminously signalling a change of lane for a motor vehicle comprises at least one element for detecting the change of lane of the vehicle and at least one control module configured to receive and process information coming from the one or more elements for detecting the change of lane and to accordingly control at least one emitting and projecting element configured to project at least one pictogram onto the road.

26 Claims, 2 Drawing Sheets

(56) References Cited

U.S. PATENT DOCUMENTS

Figure 1:
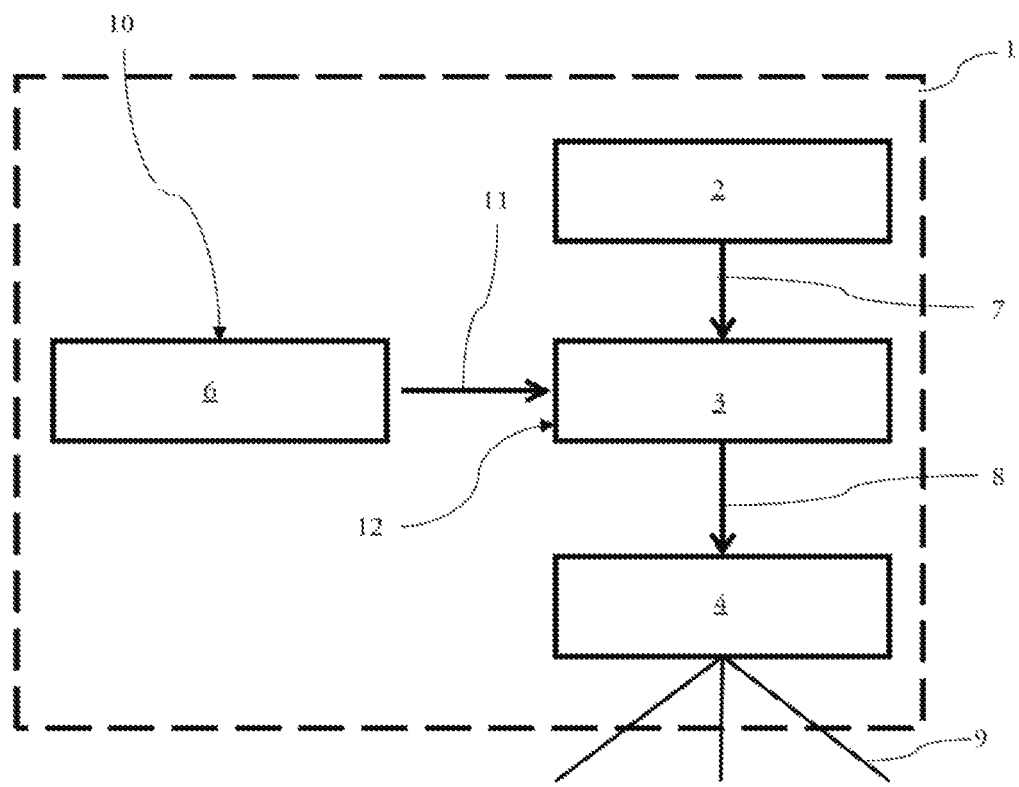

| | | | |
|---|---|---|---|
| 10,195,980 B2* | 2/2019 | Widdowson | B60Q 1/50 |
| 2013/0335212 A1 | 12/2013 | Purks et al. | |
| 2017/0193312 A1* | 7/2017 | Ai | G06K 9/4652 |
| 2017/0305332 A1* | 10/2017 | Albou | F21S 41/16 |

FOREIGN PATENT DOCUMENTS

| | | |
|---|---|---|
| DE | 10 2015 107 644 A1 | 11/2016 |
| DE | 10 2015 115 240 A1 | 3/2017 |
| FR | 3 041 110 A1 | 3/2017 |
| WO | WO-2016184721 * | 11/2016 |

* cited by examiner

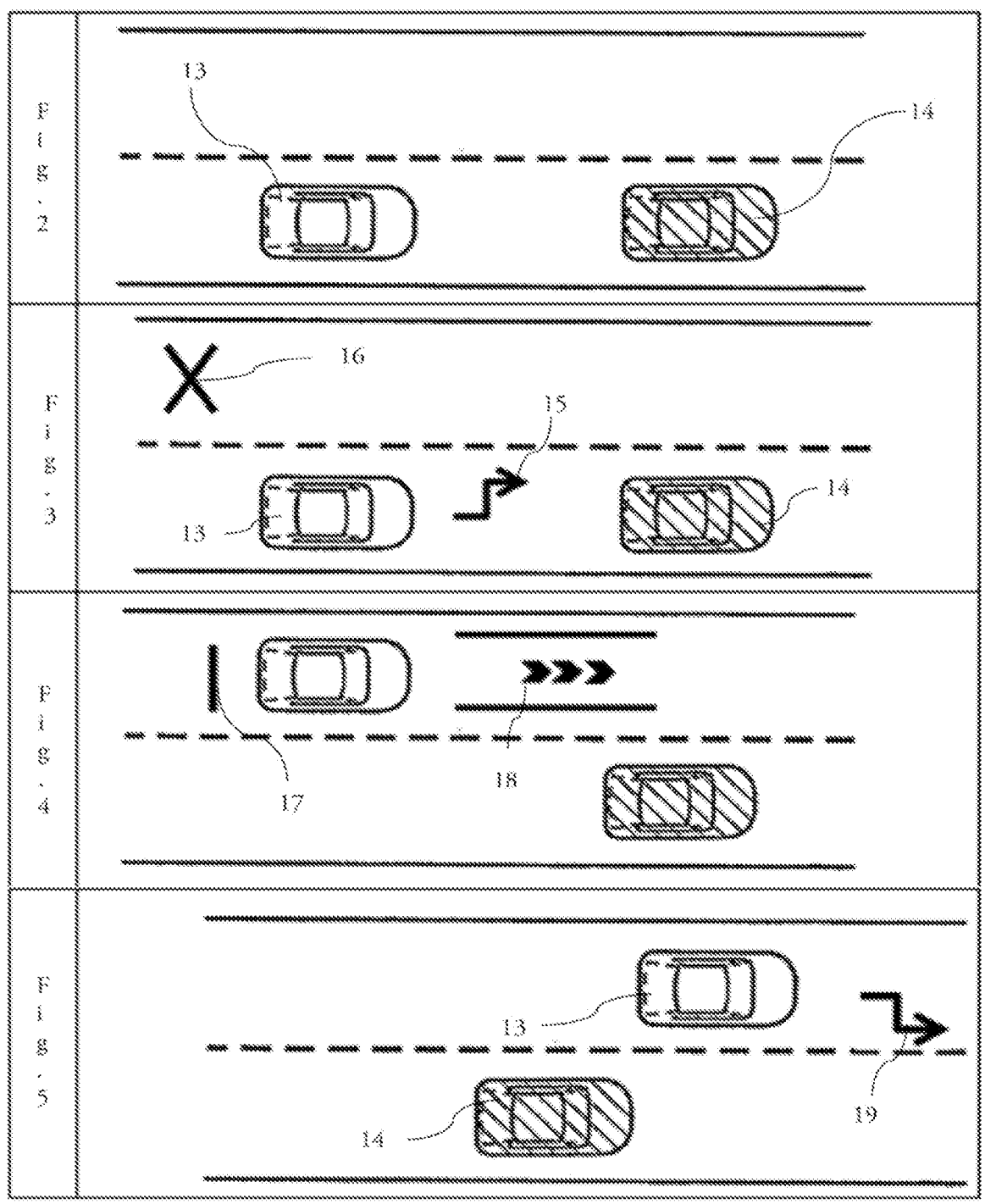

DEVICE FOR LUMINOUSLY SIGNALLING A CHANGE OF LANE FOR A MOTOR VEHICLE

The invention relates to the field of lighting and/or signalling, in particular motor-vehicle lighting and/or signalling, and it more particularly relates to signalling a change of lane of a motor vehicle and in particular an autonomous vehicle.

At the present time the change of lane of a motor vehicle is signalled by virtue of direction indicator lights the flashes of which give a luminous signal to outside the vehicle in order to warn road users. Moreover, the actuation of the direction indicator lights is accompanied by a luminous signal inside the vehicle, for example on a dashboard, in order to give warning, this time to the occupants of the vehicle, of the change-of-lane situation. This luminous display may also be accompanied, in the passenger compartment, by an audio signal.

These signals may however prove to be insufficient in the context of use of autonomous or automated vehicles.

An automated vehicle is capable of taking over from the driver in certain preset situations recognized by the vehicle whereas an autonomous vehicle is responsible for all the decisions relating to the movement of the vehicle from turn on of the engine right up to stoppage thereof.

When the vehicle is responsible for driving, whether it be a question of an autonomous or automated vehicle, the driver may be prone to no longer paying as much attention to the road scene as he does when driving the vehicle himself. Although the signals given by the flashes may allow the users of the vehicle, and in particular the driver of this vehicle, to understand that a change-of-lane decision has been taken by this vehicle, they in contrast have no information allowing them to understand such a decision, this possibly being nerve wracking for these users.

It is therefore necessary, at the present time, to provide solutions to these users in order to allow them not only to be informed that the vehicle has taken the decision to change lane but also to understand simply and rapidly the reason for this change of lane.

The present invention falls within this context and aims to make the signalling of these changes of lane more effective and more precise in particular in the context of use of autonomous or automated vehicles.

The subject matter of the present invention relates to a device for luminously signalling a change of lane for a motor vehicle. This device comprises at least one element for detecting the change of lane of said vehicle and at least one control module configured to receive and process information coming from the one or more elements for detecting the change of lane and to control accordingly at least one emitting and projecting element configured to project at least one pictogram onto the road.

The one or more elements for emitting and projecting the luminous signal may be arranged at the front of the vehicle, at the rear of the vehicle, or even on at least one lateral portion of the vehicle. It is also envisionable to combine a plurality of these arrangements in which case a vehicle will possibly comprise elements for emitting and projecting the light signal both at the front, at the rear and on at least one of its lateral portions. Thus, the position of projection of the pictogram onto the road will possibly be adapted depending on the various encountered driving situations.

According to one embodiment of the present invention, the at least one pictogram projected onto the road is a pictogram sequence computed by the control module.

A pictogram sequence comprises a plurality of predefined pictograms that are projected simultaneously or successively by one or more emitting and projecting elements.

The control module may thus compute at least one instruction to be transmitted to the emitting and projecting elements configured to project the pictogram sequence corresponding to this instruction depending on information relating to characteristics of the vehicle and of its occupants.

By "characteristics of the vehicle and of its occupants" what is meant is all of the characteristics independent of the exterior environment of this vehicle such as for example the height of the vehicle, the height of the seat of the driver of this vehicle, or even the height of the driver of this vehicle. It will be understood that taking into consideration these particular characteristics allows an optimal position on the road for the projection of the pictograms to be determined, in order to improve the visibility of the projected pictogram sequence for the driver of the vehicle and for the passengers of this vehicle.

According to one example embodiment of the present invention, the control module may also command at least one instruction to be transmitted to the emitting and projecting elements depending on information relating to the characteristics of third-party vehicles present in the environment of the vehicle comprising the device according to the present invention. Thus, the pictogram sequence will possibly be projected so as to also be easily visible by the drivers and passengers of these third-party vehicles.

The device according to the present invention may also comprise at least one unit for analysing the environment configured to detect, in real time, the presence, and optionally the type, of objects on the road.

These units for analysing the environment may thus comprise means for acquiring and processing images, which means are configured to interpret the presence of objects on the road. These means for acquiring and processing images may for example be photographic or video means, laser means or radar means associated with software packages capable of interpreting the signals transmitted by these acquiring means.

These units for analysing the environment may also be configured to compute, in real time, the distance separating the vehicle from the objects that surround it.

The objects that may be detected by these units for analysing the environment are various and may for example comprise other road users whether stopped or moving, or areas of roadworks.

The projected pictogram sequence will thus possibly for example be different when a moving object such as a third-party vehicle is being overtaken, when an immobile object such as an area of roadworks is being overtaken, or when a change of lane related to a predefined route is being performed. For example, the frequency or the type of pictograms projected will possibly be adapted depending on the detected type of situation.

The control module of the device according to the present invention may compute the pictogram sequence, and in particular the shape and projection zone of this sequence, depending on a change-of-lane situation determined by this control module from the information coming from the one or more detecting elements and depending on information relating to the environment of the vehicle, which information is transmitted to this control module by the units for analysing the environment. The control module transmits accordingly at least one instruction to at least one emitting and projecting element configured to project the computed pictogram sequence.

This control module may also compute, during the manoeuvre and depending on the acquisition, in real time, of new data by the units for analysing the environment, a modification of the pictogram sequence in the process of being projected, i.e. a new pictogram sequence, and transmit accordingly new instructions to the emitting and projecting elements.

Provision may be made for all of these instructions to be transmitted to a first emitting and projecting element. As a variant, a first instruction corresponding to a first portion of the pictogram sequence may be transmitted to the first emitting and projecting element whereas a second instruction corresponding to a second portion of the pictogram sequence is transmitted to a second emitting element. These two instructions may then be performed simultaneously or successively by the emitting and projecting elements to which they were respectively transmitted.

For example, the first instruction may be transmitted to an emitting and projecting element placed at the front of the vehicle whereas the second instruction may be transmitted to a second emitting and projecting means placed at the rear of the vehicle.

The control module may thus send the instructions to one or more emitting and projecting elements.

These instructions for example comprise the shape of the pictograms to be projected, their colour and also their position on the road depending on the characteristics of the vehicle but also depending on the positions of other road users, the positions of these road users for example forming part of the information transmitted by the units for analysing the environment.

At least one emitting and projecting element of the device according to the invention may comprise optical microelectromechanical systems.

These microelectromechanical systems reflect rays emitted by a light source depending on their position, and all of the rays thus reflected form the one or more pictograms. These microelectromechanical systems may consist of mirrors that are able to rotate about an axis, so as to each pivot between two extreme positions, at a set rotation speed. In a first position, the reflected rays are oriented toward the exit of the emitting and projecting element whereas these rays are blocked in a second position. The position of each mirror defines, for all of the mirrors, a given configuration able to form a pixel beam, capable of projecting an image in a fixed or variable way by making the appropriate mirrors change position.

The invention also relates to a motor vehicle equipped with at least one device for assisting with changing lane according to the invention.

This invention in particular relates to autonomous or automated motor vehicles. Specifically, by virtue of a projection onto the road of pictograms warning of a change of lane, the driver and all of the passengers of the vehicle are warned that the vehicle has indeed taken into account the need to change lane. For example, the users see an object getting closer and may be reassured to see the vehicle projecting a pictogram sequence showing the lane that it will take.

The present invention also comprises a method for luminously signalling a change of lane comprising a step of detecting a change of lane of the vehicle, a step of computing with the control module at least one pictogram sequence suitable for the detected situation, a step of transmitting at least one instruction corresponding to the pictogram sequence computed with the control module to at least one emitting and projecting element configured to project this pictogram sequence onto the road and a step of projecting with these emitting and projecting elements at least one pictogram onto the road.

This signalling method may also comprise, according to one embodiment of the present invention, a step of acquiring information relating to the environment of the vehicle with units for analysing the environment, a step of transmitting this information with these units for analysing the environment to the control module and a step of computing with this control module the pictogram sequence to be projected while taking into account said information relating to the environment of the vehicle.

Figure 6:
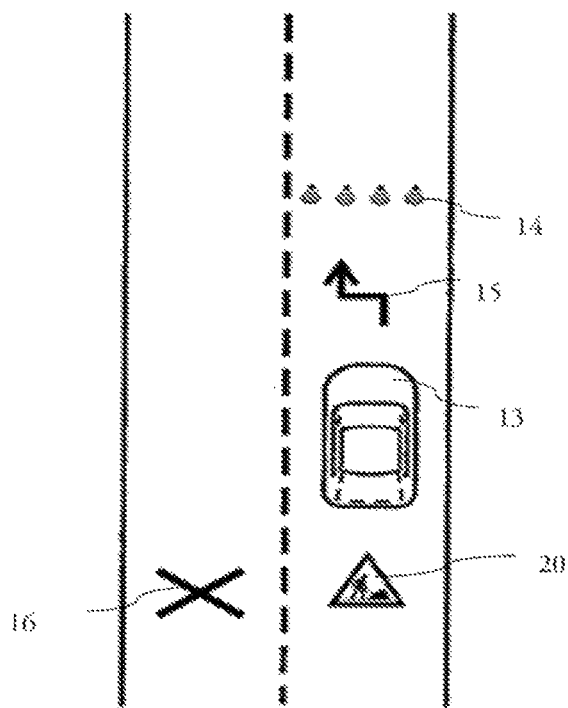

Other features, details and advantages of the present invention will become more clearly apparent on reading the detailed description given below by way of indication, with reference to the various examples of embodiments of the invention illustrated in the following figures:

FIG. 1 is a schematic view, in the form of a flow chart, of the operation of a device for luminously signalling a change of lane according to the invention, FIGS. 2 to 5 are a schematic representation of the luminously signalling method implemented by the device according to the present invention in a first situation, FIG. 6 is a schematic representation of the luminously signalling method implemented by the device according to the present invention in a second situation.

FIG. 1 schematically shows an operation of a device 1 for luminously signalling a change of lane according to the present invention.

The luminously signalling device 1 comprises at least one element 2 for detecting change of lane, at least one control module 3, at least one element 4 for emitting and projecting a luminous signal and at least one unit 6 for analysing the environment.

The element 2 for detecting change of lane may for example be a satellite geo-positioning system that detects a change of lane to come depending on a route programmed by a user of the vehicle at the start of the trip. The element 2 for detecting change of lane may also be a software package for driving an autonomous vehicle comprising the device 1 according to the present invention, which takes the decision to change lane. According to one embodiment of the present invention, it is also envisionable to combine a plurality of different detecting elements 2 in order to be able to trigger the luminously signalling device 1 according to the present invention in any change-of-lane situation that a motor vehicle may encounter.

Change-of-lane information 7 is transmitted to the control module 3 that computes, accordingly, at least one pictogram, and advantageously a plurality of pictograms forming a pictogram sequence 9, to be projected onto the road. In the example schematically shown in FIG. 1, the control module 3 computes a pictogram sequence 9 to be projected onto the road. To do this, instructions 8 corresponding to this pictogram sequence 9 are transmitted by the control module 3 to at least one emitting and projecting element 4 configured to project the pictogram sequence 9 onto the road.

By "pictogram sequence" what is meant is a plurality of pictograms that follow one after another and the logical succession of which forms information-delivering data that vary over time.

The emitting and projecting elements 4 may be arranged in order to project the pictogram sequence 9 forward, rearward, or even sideways with respect to the vehicle. A given vehicle may have a plurality of emitting and projecting elements 4 arranged to project all or some of the pictogram sequence 9 into different zones. These emitting and projecting elements 4 function independently of one another and may therefore project pictograms simultaneously or successively depending on the instructions transmitted by the control module 3.

According to one embodiment of the present invention, the emitting and projecting elements 4 comprise at least one light source associated with a matrix array of micromirrors, forming a microelectromechanical system (MEMS). These microelectromechanical systems consist of movable mirrors that are able to reflect some of the light rays emitted by the light source, each mirror being mounted so as to be able to rotate about an axis, so as to pivot between two extreme positions, at a set rotation speed. The position of each mirror defines, for all of the micromirrors, a given configuration able to form a pixel image. It is thus possible to project at least one pictogram in a fixed or variable way by making the appropriate mirrors change position.

The control module 3 may take a plurality of parameters into account to compute the pictogram sequence 9 and the corresponding instructions 8 to be transmitted to the emitting and projecting elements 4. This control module 3 may for example compute the instructions 8 corresponding to the pictogram sequence 9 depending on the characteristics 12 of the vehicle and of its occupants. It should be noted that the characteristics of the vehicle are independent of the exterior environment of this vehicle.

These characteristics 12 may for example relate to the position and/or orientation of the seats, to the position and/or height of the occupants of the vehicle, to the height of the automobile or even to the number of passengers. All of these characteristics 12 together in particular allow the control module 3 to compute an optimal zone for projection of the pictogram sequence 9 allowing the driver of the vehicle, and the largest possible number of occupants of this vehicle, to see the projected pictogram sequence 9 and thus to be warned of the change of lane to come.

As illustrated in FIG. 1, the luminously signalling device 1 according to the invention may comprise at least one unit 6 for analysing the exterior environment of the vehicle. This unit 6 for analysing the environment is in particular configured to detect and interpret the presence of objects in the environment of a vehicle comprising the device 1 according to the present invention. It may also be configured to measure exterior luminosity, to analyse the type of surface of the road or even to detect the presence of bumps or rough patches in this road. This unit 6 for analysing the environment may also be configured to compute the distance separating the vehicle from the detected objects.

The unit 6 for analysing the environment may comprise means for acquiring and processing images, which means are configured to interpret the presence of objects on the road. The acquiring means may in particular consist of photo-video means, radar systems, laser means or any other sensor allowing the same type of data to be collected. This unit 6 for analysing the environment then also comprises means for processing the gathered images capable of interpreting the presence and position of objects.

The unit 6 for analysing the environment transmits the information thus gathered to the control module 3 which may then take it into account during the computation of the pictogram sequence 9 to be projected alternatively or cumulatively to taking into account the characteristics 12 of the vehicle. Optionally, this information may be gathered by the unit 6 for analysing the environment in real time, thereby making it possible for the control module 3 to then be able to modify the pictogram sequence 9 to be projected in real time, for example depending on changes in the position of third-party vehicles.

The objects that the unit 6 for analysing the environment is able to detect are varied and comprise any object with which the vehicle is liable to enter into collision. It may for example be a question of other vehicles, whether moving or not, pedestrians or even areas of roadworks.

The information regarding the exterior environment transmitted to the control module 3 by the unit 6 for analysing the environment may allow this control module 3 to adapt at least one appearance of the pictogram sequence 9 to be projected. The control module 3 will for example modify a shape, a colour or even an intensity of this pictogram sequence 9. By way of example, the elements 4 for emitting and projecting the luminous signal will possibly thus comprise at least one RGB (red-green-blue) diode capable of projecting luminous signals of various colours. In addition, the information regarding the presence of objects in the environment of the vehicle also allows the control module 3 to adapt the projection zone of the pictogram sequence 9 so that the latter is clearly visible to all of the users present in this environment.

For example, the pictogram sequence 9 may be projected beyond the detected object 14 so that road users located behind this object can also perceive this sequence projected on the ground.

As a result of the above the control module 3 may take into account both information relating to the characteristics of the vehicle and of its occupants, and information relating to the environment transmitted to this control module 3 by the unit 6 for analysing the environment. The control module 3 may then compute the pictogram sequence 9 and the instructions 8 corresponding to the projection of this pictogram sequence 9 so that the users of the vehicle and users present in the environment of this vehicle are alerted to the change of lane to come and to the reason for which this change of lane is required.

FIGS. 2 to 5 illustrate a first change-of-lane situation implementing the luminous signalling device according to the invention. In these figures, an autonomous first vehicle 13 is equipped with the luminously signalling device 1 according to the invention. The autonomous first vehicle 13 is shown in a situation in which the unit for analysing the environment detects the presence of an object 14. In this example, the object 14 is a second vehicle moving at a speed lower than the speed at which the autonomous first vehicle 13 is moving, and the autonomous first vehicle 13 then makes the decision to overtake this object 14. The element for detecting change of lane detects the change of lane to come and sends information on this change of lane, and the reasons for which it is required, to the control module, which then computes a pictogram sequence to be projected onto the road.

According to one variant embodiment of the invention, the luminously signalling device 1 may be installed in a conventional vehicle, the decision to change lane to overtake the object 14 then being made by the driver of this conventional vehicle. It will be understood that in this variant, the projection of one or more pictograms mainly allows the other occupants of the vehicle to be informed of the reasons for the change of lane, the driver in this case being aware of these reasons.

According to the embodiment shown in FIGS. 2 to 5, the projected pictogram sequence comprises five different pictograms 15, 16, 17, 18, 19 certain of which are projected simultaneously and others of which are projected successively to one another. Specifically, in this embodiment the control module may share the pictogram sequence in various portions and thus transmit various instructions to various emitting and projecting elements, each of the instructions corresponding to one of the portions of the computed pictogram sequence.

In FIG. 3 two pictograms 15, 16 are illustrated, which define a first portion of the pictogram sequence. A first pictogram 15 represents an arrow indicating the change of lane that will be performed by the first vehicle 13 and a second pictogram 16 indicates to users located behind the first vehicle 13 that a change of lane will be performed by this first vehicle 13. The first pictogram 15 is projected into a zone visible by the occupants of the first vehicle 13 and by the occupants of the detected object 14 whereas the second pictogram 16 is projected into a zone visible at least by the occupants of the one or more vehicles following the first vehicle 13.

A second portion of the pictogram sequence is illustrated in FIG. 4 with two new pictograms 17, 18. These new pictograms 17, 18 indicate a change of lane is in course, this change of lane corresponding in the present case to an overtake manoeuvre. The pictogram 17 warns users arriving behind the first vehicle 13 that an overtake manoeuvre is in course, whereas the pictogram 18 indicates the direction of movement of the first vehicle 13 in order to make visible, both to the occupants of the first vehicle 13 and to those of the object 14, the progress of the overtake manoeuvre. Lastly, such as shown in FIG. 5, the control module may provide a third portion of the pictogram sequence comprising an again different pictogram 19 indicating that the first vehicle 13 will return to the lane in which it was initially.

The control module is configured to compute an optimal projection zone for each of these pictograms taking into account, as mentioned above, characteristics of the vehicle and of its occupants but also other road users. Thus, the pictograms are projected so as to be visible to all of the road users so that the latter are warned of the performed manoeuvre, and the advance of this manoeuvre.

For example, in the example illustrated in FIGS. 2 to 5, the pictograms 15, 18 and 19 are projected onto the road by emitting and projecting elements arranged at the front of the first vehicle 13 whereas the pictograms 16 and 17 are projected onto the road by emitting and projecting elements arranged at the rear of this first vehicle 13.

The emitting and projecting elements arranged at the front of the vehicle may for example be placed in the side rear-view mirrors or the central rear-view mirror and the emitting and projecting elements arranged at the rear of the vehicle may for example be placed in proximity to conventional lighting systems.

FIG. 6 for its part shows a second change-of-lane situation, in which the object 14 detected by the unit for analysing the environment and motivating the change of lane by the vehicle 13 is an area of roadworks. In this case, the control module receives information indicating detection of a change of lane by the element for detecting change of lane, and information indicating that the object 14 to be overtaken is an area of roadworks from the unit for analysing the environment. By the virtue of this information, the control module computes the shape and position of projection of the pictogram sequence. In this example, three pictograms 15, 16, 20 are simultaneously projected by a plurality of emitting and projecting elements. In accordance with what was described above, these pictograms include the pictogram 15 indicating a change of lane to come to the driver and to the occupants of the first vehicle 13 and the pictogram 16 warning the users located behind the first vehicle 13 that a change of lane will be initiated by this first vehicle 13. In this second situation, an additional pictogram 20 is also projected and allows road users following the vehicle to be warned that the change of lane to come is related to the presence of an area of roadworks.

As mentioned above, the unit for analysing the environment may operate in real time and may therefore send information, in real time, to the control module. Thus in unexpected circumstances, such as the rapid arrival of a third party vehicle for example, the control module may recompute the pictogram sequence depending on these new parameters and send accordingly new instructions to the emitting and projecting elements.

The above description clearly explains how the invention allows the objectives that were set therefor to be achieved, in particular by providing a device for luminously signalling a change of lane of a vehicle that, on the basis of information on the vehicle and its environment, projects a pictogram or a pictogram sequence onto the road warning users of said vehicle, and other users located in the environment of this vehicle, of a change of lane to come or in course. The invention has many advantageous applications, whether it is a question of informing users of a change of lane or of the reasons for which this change of lane is required.

Of course, various modifications may be made by those skilled in the art to the device for luminously signalling a change of lane of a vehicle that has just been described by way of nonlimiting example, provided that at least one element for detecting a change of lane, at least one control module configured to compute at least one instruction corresponding to at least one pictogram, and at least one element for emitting and projecting said pictogram are employed.

In any case, the invention is not limited to the embodiment specifically described in this document, and in particular encompasses any equivalent means and any technically workable combination of these means.

The invention claimed is:

1. Device for luminously signaling a change of lane for a motor vehicle, comprising
   at least one element for detecting the change of lane of the vehicle, and
   a control module configured to receive and process information coming from the at least one element for detecting the change of lane, to compute at least one instruction for projecting at least one pictogram as a result of the information and to transmit the at least one instruction to at least one emitting and projecting element configured to project the at least one pictogram onto a road,
   wherein the control module:
   sends a first instruction to a first emitting and projecting element located on a first side of the motor vehicle to project a first pictogram onto the road on the first side; and
   sends a second instruction to a second emitting and projecting element located on a second side of the motor vehicle different from the first side to project a second pictogram onto the road on the second side at the same time the first pictogram is projected onto the road.

2. Device according to claim 1, wherein the control module computes the at least one instruction depending on information relating to characteristics of the vehicle and of its occupants.

3. Device according to claim 1, comprising at least one unit for analyzing the exterior environment of the vehicle configured to detect presence of objects on the road.

4. Device according to claim 3, wherein the at least one unit for analyzing the environment comprises means for acquiring and processing images, which means are configured to interpret the presence of objects on the road.

5. Device according to claim 3, wherein the at least one unit for analyzing the environment is configured to compute a distance separating the vehicle from surrounding objects.

6. Device according to claim 3, wherein the control module computes the at least one instruction for projecting at least one pictogram depending on a change-of-lane situation determined by the control module from the information coming from the at least one detecting element and depending on information relating to the exterior environment of the vehicle, the information being transmitted to the control module by the at least one unit for analyzing the environment.

7. Device according to claim 6, wherein the control module is configured to receive in real-time new data via the at least one unit for analyzing the environment, in order to compute, during the change of lane and depending on acquisition of these new data by the at least one unit for analyzing the environment, at least one new pictogram and to transmit accordingly at least one new instruction to the at least one emitting and projecting element.

8. Device according to claim 1, wherein the at least one pictogram projected onto the road is a pictogram sequence computed by the control module.

9. Device according to claim 8, wherein the control module transmits all of the instructions corresponding to the pictogram sequence to a first emitting and projecting element configured to project the pictogram sequence onto the road.

10. Device according to claim 8, wherein the control module transmits a first instruction corresponding to a first portion of the pictogram sequence to the first emitting and projecting element and a second instruction corresponding to a second portion of the pictogram sequence to a second emitting and projecting element configured to project the pictogram sequence onto the road, these two instructions being performed one of simultaneously and successively by the emitting and projecting elements to which they have been transmitted.

11. Device according to claim 9, wherein the control module sends the instructions to one or more emitting and projecting elements depending on information relating to the exterior environment of the vehicle that have been transmitted thereto by at least one unit for analyzing the environment.

12. Device according to claim 1, wherein the at least one element for emitting and projecting the luminous signal comprises optical microelectromechanical systems.

13. Motor vehicle equipped with a luminously signaling device according to claim 1.

14. Method for luminously signaling a change of lane of a vehicle, comprising
a step of detecting a change of lane of the vehicle,
a step of computing with a control module at least one pictogram sequence suitable for a detected situation,
a step of transmitting at least one instruction corresponding to the pictogram sequence computed with the control module to at least one emitting and projecting element configured to project the pictogram sequence onto a road, and
a step of projecting with the at least one emitting and projecting element the pictogram sequence onto the road,
the method comprising:
sending a first instruction to a first emitting and projecting element located on a first side of the vehicle to project a first pictogram onto the road on the first side, and
sending a second instruction to a second emitting and projecting element located on a second side different from the first side to project a second first pictogram onto the road on the second side at the same time the first pictogram is projected onto the road.

15. Signaling method according to claim 14, comprising
a step of acquiring information relating to an environment of the vehicle with at least one unit for analyzing the environment,
a step of transmitting the information with the at least one unit for analyzing the environment to the control module, and
a step of computing with the control module the pictogram sequence to be projected taking into account the information relating to the environment of the vehicle.

16. Device according to claim 3, wherein the at least one unit for analysing the exterior environment of the vehicle is configured to detect presence of objects on the road.

17. Device according to claim 4, wherein the at least one unit for analyzing the environment is configured to compute a distance separating the vehicle from surrounding objects.

18. Device according to claim 4, wherein the control module computes the at least one instruction for projecting at least one pictogram depending on a change-of-lane situation determined by the control module from the information coming from the at least one detecting element and depending on information relating to an exterior environment of the vehicle, which information is transmitted to the control module by the at least one unit for analyzing the environment.

19. Device according to claim 2, wherein the at least one pictogram projected onto the road is a pictogram sequence computed by the control module.

20. Device according to claim 10, wherein the control module sends the instructions to the at least one emitting and projecting element depending on information relating to an exterior environment of the vehicle that have been transmitted thereto by at least one unit for analyzing the environment.

21. Device according to claim 1, wherein the control module:
sends the first instruction to the first emitting and projecting element to project the first pictogram onto the road in front of the motor vehicle; and
sends the second instruction to the second emitting and projecting element to project the second first pictogram onto the road in back of the motor vehicle.

22. Device according to claim 1, wherein:
the first pictogram is designed to convey information to occupants of the motor vehicle; and
the second pictogram is designed to convey information to occupants of another vehicle located behind the motor vehicle.

23. Device according to claim 1, wherein:
the first pictogram is designed to convey information to occupants of the motor vehicle and occupants of a vehicle located ahead of the motor vehicle; and
the second pictogram is designed to convey information to occupants of another vehicle located behind the motor vehicle.

24. Signaling method according to claim 14, comprising:
sending the first instruction to the first emitting and projecting element to project the first pictogram onto the road in front of the motor vehicle; and
sending the second instruction to the second emitting and projecting element to project the second first pictogram onto the road in back of the motor vehicle.

25. Signaling method according to claim 14, comprising:
projecting the first pictogram to convey information to occupants of the motor vehicle; and
projecting the second pictogram to convey information to occupants of another vehicle located behind the motor vehicle.

26. Signaling method according to claim 14, comprising:
projecting the first pictogram to convey information to occupants of the motor vehicle and occupants of a vehicle located ahead of the motor vehicle; and
projecting the second pictogram to convey information to occupants of another vehicle located behind the motor vehicle.

* * * * *